United States Patent
Goy et al.

(10) Patent No.: US 9,886,060 B2
(45) Date of Patent: Feb. 6, 2018

(54) MISSION PREPARATION SYSTEM, NOTABLY FOR AIRCRAFT COMPRISING A DOCKING STATION

(71) Applicant: Thales, Neuilly sur Seine (FR)

(72) Inventors: Jean-Marie Goy, Gradignan (FR); Dorian Santiago, Talence (FR); Alice Bertaud Du Chazaud, Toulouse (FR)

(73) Assignee: Thales, Neuilly sur Seine (FR)

( * ) Notice: Subject to any disclaimer, the term of this patent is extended or adjusted under 35 U.S.C. 154(b) by 646 days.

(21) Appl. No.: 14/082,050

(22) Filed: Nov. 15, 2013

(65) Prior Publication Data

US 2016/0154430 A1    Jun. 2, 2016

(30) Foreign Application Priority Data

Nov. 16, 2012 (FR) ...................................... 12 03074

(51) Int. Cl.
*G06F 1/16* (2006.01)
*B64D 45/00* (2006.01)

(52) U.S. Cl.
CPC ........... *G06F 1/1632* (2013.01); *B64D 45/00* (2013.01); *G06F 1/1679* (2013.01); *B64D 2045/0075* (2013.01)

(58) Field of Classification Search
CPC ..... G06F 1/1632; G06F 1/1679; B64D 45/00; B64D 2045/0075; H04N 2201/0058; A61M 2209/086
USPC .......... 361/679.41, 679.43–679.45; 710/303; 710/304; D14/434
See application file for complete search history.

(56) References Cited

U.S. PATENT DOCUMENTS

| 6,400,560 B1* | 6/2002 | Chian ................. B60R 11/0235 248/917 |
| 7,321,488 B2* | 1/2008 | Ito ......................... G06F 1/1626 312/223.2 |
| 2006/0119569 A1* | 6/2006 | Tsai ...................... G06F 1/1626 345/156 |
| 2007/0097617 A1* | 5/2007 | Searby ................ F16M 11/041 361/679.4 |
| 2007/0132894 A1 | 6/2007 | Vitito |

(Continued)

FOREIGN PATENT DOCUMENTS

WO    WO 2010/007732 A1    1/2010

OTHER PUBLICATIONS

French Search Report for French Counterpart Application No. FR 1203074, 8 pgs. (dated Apr. 13, 2013).

*Primary Examiner* — Jayprakash N Gandhi
*Assistant Examiner* — Stephen Sul
(74) *Attorney, Agent, or Firm* — Blakely, Sokoloff, Taylor & Zafman LLP

(57) ABSTRACT

The general field of the invention is that of electronic mission preparation systems, notably for aircraft pilots. The system comprises a removable touch tablet and an associated connection support or docking station intended to be mounted on an aircraft instrument panel. The connection support comprises a mechanical support comprising translational guiding means and a pivoting pallet comprising mechanical means for rapidly locking and unlocking the touch tablet This connection support also comprises a memory card and electrical connectors. These provisions together ensure both the electrical and mechanical connections of the tablet to the avionics system via the connection support.

3 Claims, 5 Drawing Sheets

(56) References Cited

U.S. PATENT DOCUMENTS

| | | | | |
|---|---|---|---|---|
| 2009/0270727 A1* | 10/2009 | Zhao | A61B 8/00 | |
| | | | | 600/437 |
| 2011/0194232 A1* | 8/2011 | Saila | G06F 1/1616 | |
| | | | | 361/679.01 |
| 2012/0095624 A1* | 4/2012 | Budan | G07C 5/0858 | |
| | | | | 701/14 |
| 2012/0170203 A1* | 7/2012 | Oberpriller | G06F 1/1656 | |
| | | | | 361/679.41 |
| 2012/0225622 A1* | 9/2012 | Kudrna | H04M 1/0256 | |
| | | | | 455/41.2 |
| 2013/0092811 A1* | 4/2013 | Funk | F16M 13/02 | |
| | | | | 248/371 |
| 2014/0049904 A1* | 2/2014 | Hume | G06F 1/1632 | |
| | | | | 361/679.41 |
| 2014/0074322 A1* | 3/2014 | Baumgarten | G05B 23/0216 | |
| | | | | 701/3 |

\* cited by examiner

US 9,886,060 B2

MISSION PREPARATION SYSTEM, NOTABLY FOR AIRCRAFT COMPRISING A DOCKING STATION

BACKGROUND OF THE INVENTION

1. Field of the Invention

The main field of the invention is that of general aviation, from business jets and transport aeroplanes to helicopters, both civilian and military. More specifically, the field of the invention is that of the flight preparation systems. However, and more generally, the system according to the invention can be applied to ail kinds of vehicles requiring the preparation of a route or of a trip or of a mission. Thus, the system according to the invention applies to the road or rail or maritime field.

2. Description of the prior art

The aeronautical flight preparation systems, better known by the term "Electronic Flight Bag" or "EFB", enable the pilot to display information in addition to the flight system. Such information comprises information on the landing grounds, the radio frequencies or the start up or maintenance checklists. These systems also make it possible to prepare a flight plan. The EFB systems significantly simplify the pre-flight tasks of the pilot and considerably reduce the quantity of on-board paper documents.

Generally, these systems take the form of PC-type portable microcomputers or of touch tablets comprising a display screen.

It is essential for this PC or this tablet to be able to be connected to the avionics system of the craft so as to interact with the craft systems. It is also important for it to be removable so that the crew members can carry it away on the ground to update the information or prepare a flight or a mission. The connection to the aeroplane system allows for interaction between the two parts and rapid updates.

It is therefore advantageous to have a system which can be connected rapidly and securely to the avionics system of the craft.

Three types of system currently exist:
- so-called "class 1" stand-alone portable systems, which are like portable microcomputers. These systems have the drawback of not being able to be connected and not making it possible to recover on-board information;
- so-called "class 2" EFB systems, that can be disconnected without tools in under a minute;
- so-called "class 3" EFB systems, installed in the aeroplane, always connected to the avionics and which can be disconnected only with the use of tools. These systems cannot be used in a roaming manner by the pilot.

SUMMARY OF THE INVENTION

The flight preparation system, or EFB, according to the invention makes it possible to easily and rapidly mechanically connect the EFB to the on-board system, with automatic blocking without any manual action, and to electronically connect to the on-board network to have aeroplane-specific parameters upon connection. To this end, a memory is located in the base that stays on the aeroplane, which stores fixed information and gives that information to the EFB upon connection. This memory is specific to the aeroplane and is used only when the EFB is connected to the base.

More specifically, the subject of the invention is an electronic mission preparation system for vehicles, said system comprising a touch tablet and a connection support intended to be mounted on the instrument panel of said vehicle, characterized in that:

the connection support comprises:
- a mechanical support comprising first translational guiding means;
- a pivoting pallet comprising first mechanical securing means and a return spring;
- first computer connection means with an avionics system;
- second computer connection means with the touch tablet;

the touch tablet comprises, on its rear face:
- second translational guiding means complementing the first translational guiding means;
- second securing means complementing the first securing means;
- third computer connection means with the computer connection support complementing the second computer connection means of the connection support;

the pivoting pallet being arranged in such a way that:
- when the touch tablet is positioned on the connection support, the return spring secures the first mechanical securing means in the second mechanical securing means in a locked position; and
- to unlock the touch tablet from its connection support, a press on the pivoting pallet with a force greater than that of the return spring is necessary to release the second mechanical securing means from the first mechanical securing means.

Advantageously, the connection support comprises a storage memory connected to the first connection means and to the second connection means.

Advantageously, the first translational guiding means and the second translational guiding means constitute a mechanical dovetail system.

Advantageously, the first mechanical securing means are centring pins and the second securing means are notches of a form corresponding to said centring pins.

Advantageously, the vehicle is an aircraft and the touch tablet is an "Electronic Flight Bag".

BRIEF DESCRIPTION OF THE DRAWINGS

The invention will be better understood and other advantages will become apparent on reading the following non-limiting description and from the appended figures in which.

DETAILED DESCRIPTION

Hereinbelow, and in a nonlimiting manner, the mission preparation system is more particularly described for aeronautical applications. The modifications to be made to the system to change technical field are minor and remain within the scope of the general knowledge of a person skilled in the art. Thus, this type of system can be applied to the automobile or rail domain for any computer accessory of tablet type likely to be easily connected to and disconnected from the central electronic control system of the vehicle and requiring information interchanges therewith.

The electronic flight preparation system for an aircraft pilot according to the invention comprises a touch tablet and a support mounted on an aircraft instrument panel. A guide is incorporated in the tablet so as to automatically lock it on its base and connect it by the same operation.

Hereinafter in the description, the connection support will be referred to interchangeably as connection base or "Aircraft Docking Station" or even "Aircraft DIS" and the touch tablet will be referred to interchangeably as "Electronic Flight Bag" or "EFB". An electrical connector necessarily comprises two parts. Hereinafter in the description, these two parts will be arbitrarily called "socket" and "plug" to differentiate them.

Figure 1:
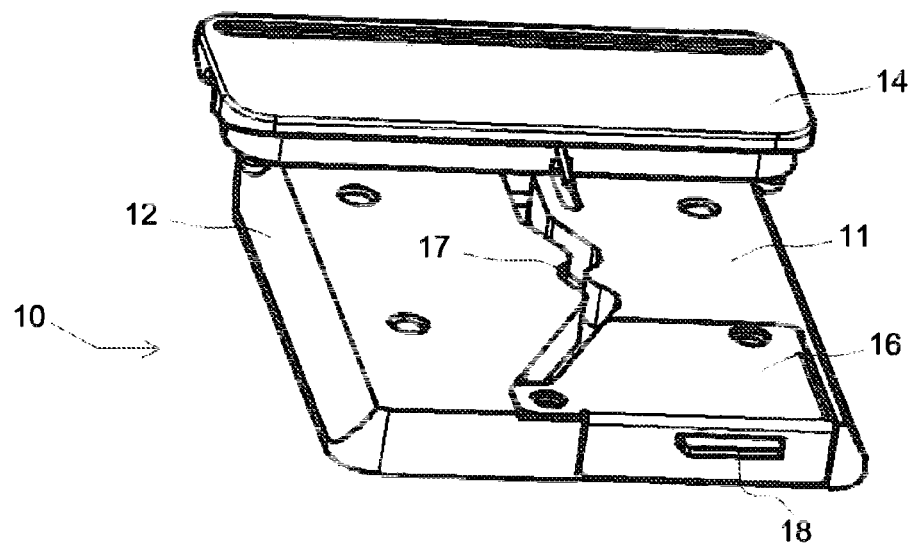
FIGS. 1 to 3 represent a front view, a back view and an underside view of the connection support according to the invention.
Figure 2:
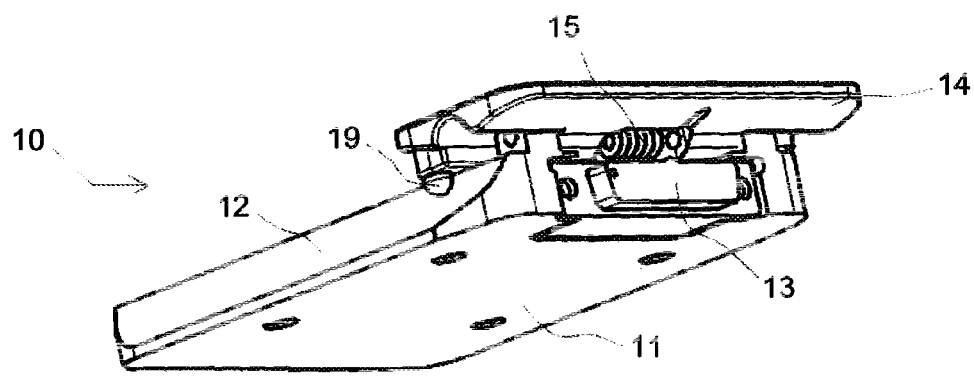
Figure 3:
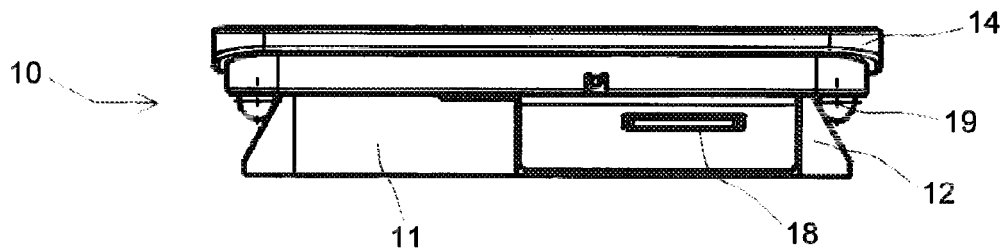

As a nonlimiting example, FIGS. 1 to 3 represent three views of a connection support 10 according to the invention which are, respectively. a front view, a back view and a plan view.

The latter comprises a mechanical support 11 bearing translational guiding means. In the present case, this guiding is ensured by the male part of a dovetail, that is to say a trapezoidal tenon 12. The end of this tenon 12 has fixed to it a socket 13 of a tablet connector and a pivoting pallet 14 comprising a return spring 15, which can be seen in FIG. 2. At the bottom of the connection support 10, there is installed an electronic mini-card supporting the socket of a connector for a memory card of "SD" or "micro SD" type linked by four wires to the socket 13 of the tablet connector. The memory card is protected by a cover 16 and is not visible in the different figures.

The mechanical support 11 comprises a zigzag central groove 17 visible in FIG. 1, which receives a cable which links the socket 13 of the tablet connector to the socket 18 of the system connector of the avionics system and to the four wires of the micro SD memory card. The zigzag form of the groove makes it possible to secure the cable and prevent any tearing away of the wires from the connector. In the interests of clarity, this cable is not represented in the different figures.

On the top of the mechanical support 11, the pivoting pallet 14 ensures the locking of the tablet by means of two spherical securing pins 19

Figure 4:
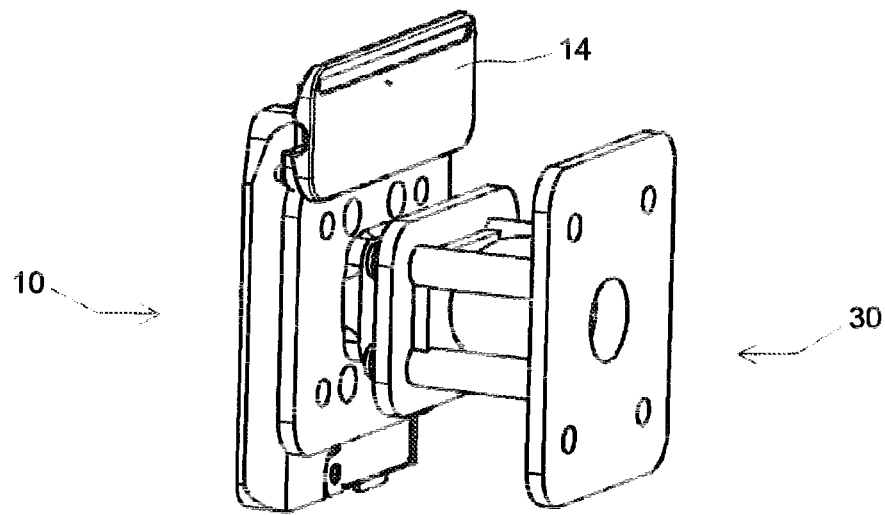
FIG. 4 represents a view of an assembly comprising a fixing frame and a connection support according to the invention.

By way of example. the support assembly 10 is fixed by four screws onto a frame with ball joint 30 as represented in the perspective view of FIG. 4. This frame 30 is fixed to the aeroplane, for example under one of the side windows. When the support 11 is mounted in the frame 30, the cable which links the socket of the tablet connector 13 to the socket of the system connector 18 is jammed in the groove 17 and exits at the end of the groove to be connected to the socket of the system connector of the avionics system.

Figure 5:
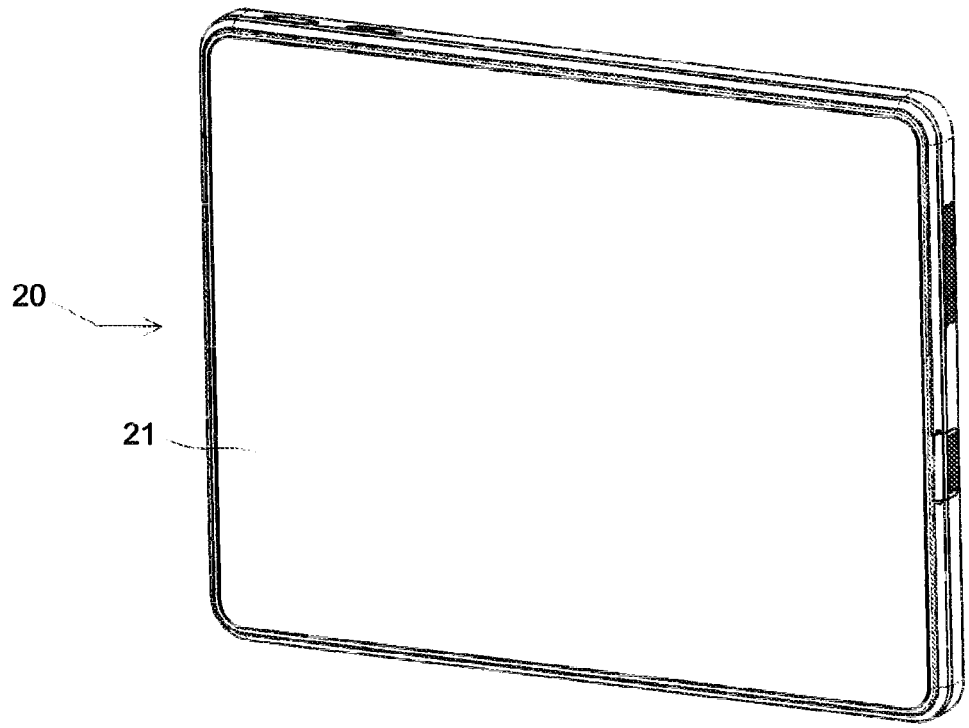
FIGS. 5 to 7 represent a front view, a back view and an underside view of the touch tablet according to the invention.
Figure 6:
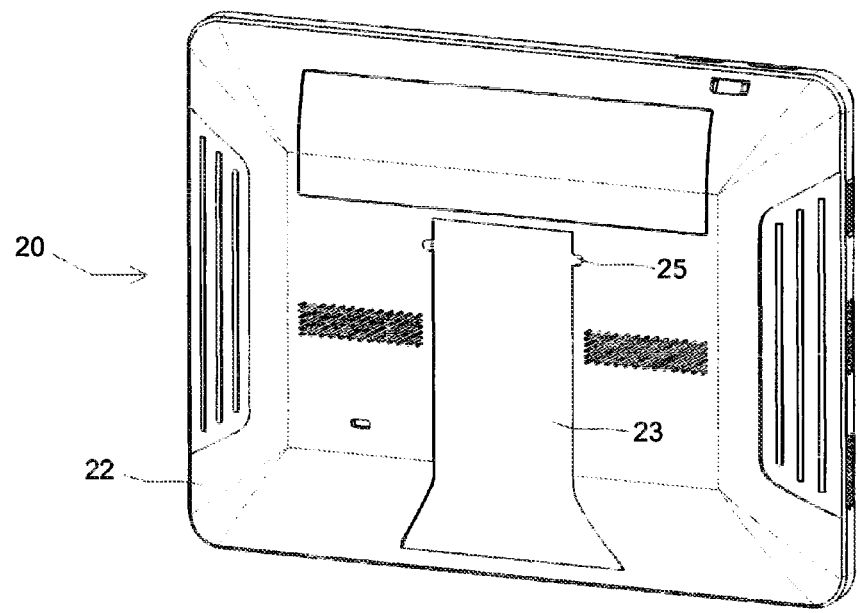
Figure 7:
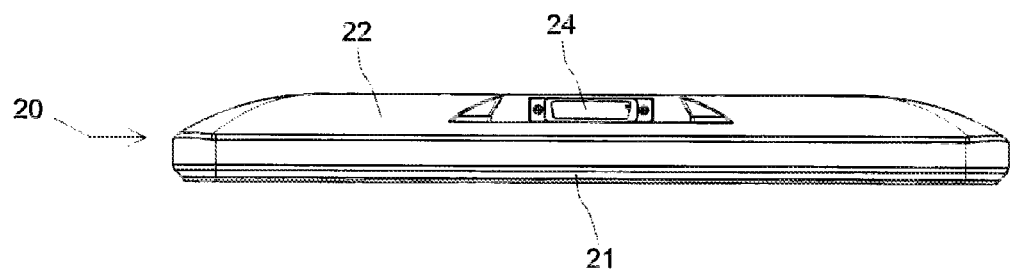

As a nonlimiting example, FIGS. 5 to 7 represent three views of a touch tablet 20 according to the invention which are, respectively, a front view, a back view and an underside view.

This tablet 20 comprises, on the front panel, a display screen 21, generally of touch type. The rear cover of the tablet 22 is modified in the central part so as to include the female part in the form of a groove or slideway 23 of the dovetail. At the top of this cavity, the plug 24 of the tablet connector is installed. At the top of this slideway 23, there are also two notches 25 intended to receive the securing pins 19 of the locking pallet 14.

To assemble the EFB 20 on its support 10, all that is required is to offer up the bottom part of the tablet 20 to the top of the support and allow the tablet to slide onto the support to abutment. The pallet 14, having slid over the EFB cover in a raised position through the effect of the two spherical pins, tilts under the effect of the return spring 15 and notches 25 provided at this point and locks the tablet 20 on the support 10. The connection with the avionics system and the SD memory card is made immediately the locking occurs. The spring 15 makes it possible to keep a pressure on the two pins 19 and prevents unlocking during vibration when the aircraft is taxiing, for example.

To remove the tablet 20 from the support 10, all that is required is to slightly pivot the pallet 14, so as to extract the two pins 19 inserted into the tablet 20 and then slide the EFB 20 upwards to extract it from the support 10.

Thus, the mechanical and electronic connection of the tablet to its support and its disconnection require only operations that are very simple to perform for an operator.

Figure 8:
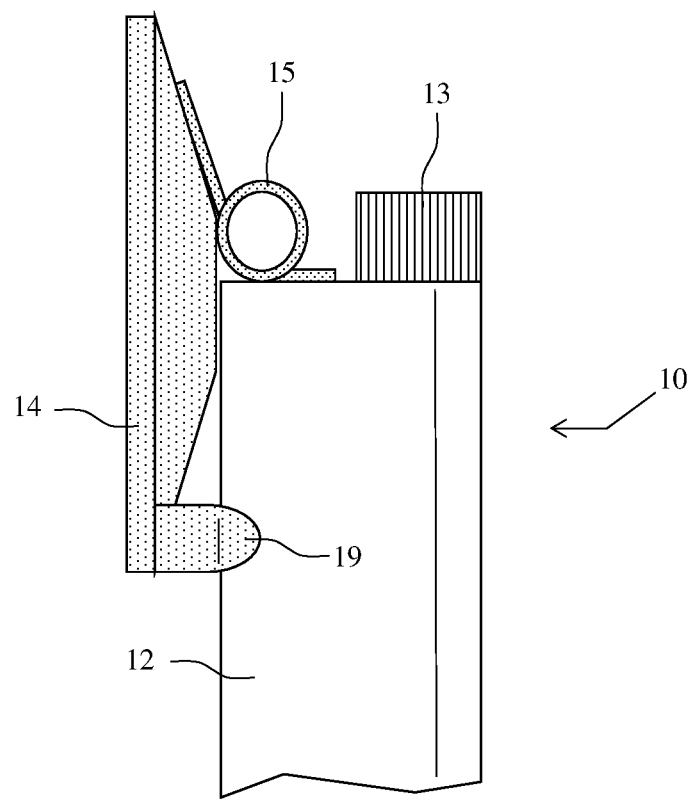
FIG. 8 represents a partial side view of the connection support according to the invention.
Figure 9:
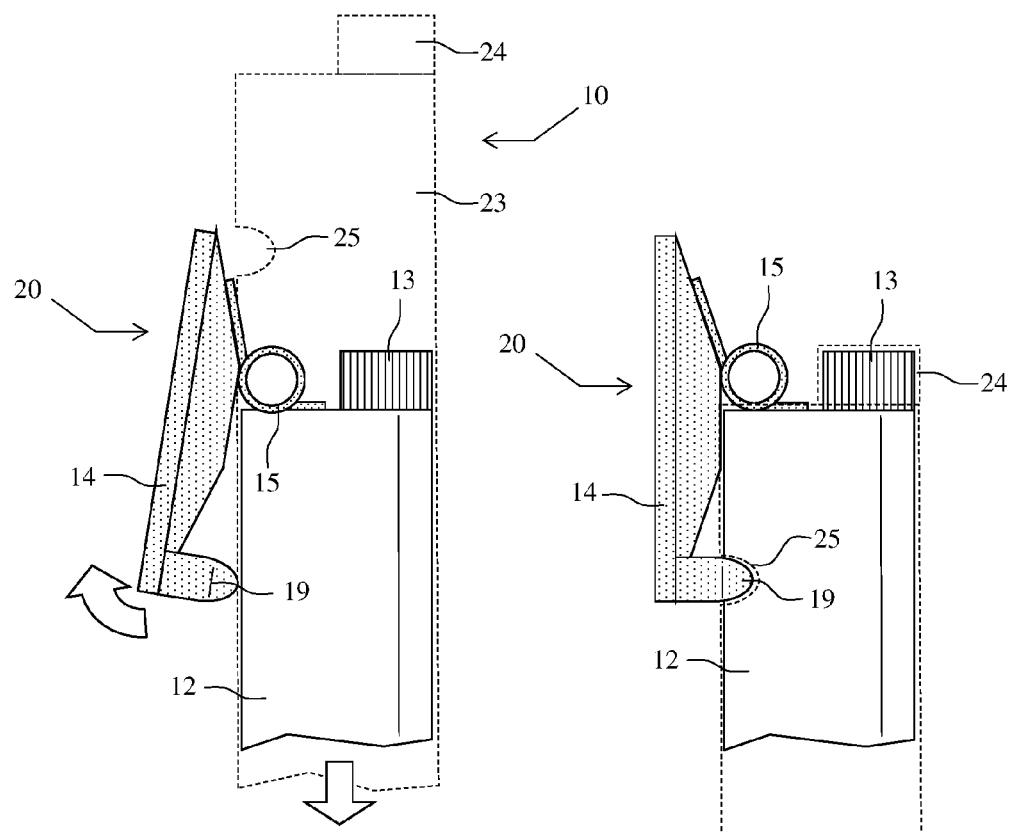
FIG. 9 represents a partial side view of the connection support and the tablet during assembly according to the invention.
Figure 10:
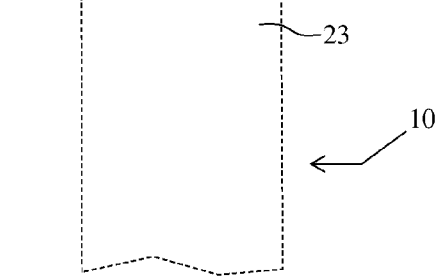
FIG. 10 represents a partial side view of the connection support and the tablet after assembly.

As a non-limiting example, FIGS. 8 to 10 represent three side views of a connection support 10, the connection support 10 and a touch tablet 20 during assembly, and the connection support 10 and the touch tablet 20 after assembly (securing pins 19 into notches 25 and tablet connector 13 into plug 24) according to the invention, respectively.

What is claimed is:

1. An electronic mission preparation system for aircraft, said system comprising an electronic flight bag in the form of a touch tablet and a connection support intended to be mounted on an instrument panel of the aircraft, wherein:
   the connection support comprises:
      a storage memory that has one or more wires, a mechanical support comprising a first translational guiding component and a central guiding groove,
      a pivoting pallet comprising one or more first mechanical securing components and a return spring, wherein the one or more first mechanical securing components are centering pins,
      a first computer connector with an avionics system, wherein the first computer connector has a first socket, and
      a second computer connector with the touch tablet, wherein the second computer connector has a second socket, and wherein the central guiding groove receives a cable linking the second socket of the second computer connector to the first socket of the first computer connector to the one or more wires of the storage memory,
      wherein the connection support is fixed by one or more screws onto a frame with a ball joint;
   the touch tablet comprises:
      a second translational guiding component complementing the first translational guiding component,
      one or more second securing components complementing the one or more first mechanical securing components, wherein the one or more second securing components are notches of a form corresponding to the centering pins, and
      a third computer connector with the connection support complementing the second computer connector of the connection support; and the pivoting pallet further arranged in such a way that:
      when the touch tablet is positioned on the connection support, the return spring secures the one or more first mechanical securing components in the one or more second securing components in a locked position, and to unlock the touch tablet from the connection support, a press on the pivoting pallet with a force greater than that of the return spring is necessary to release the one or more second securing components from the one or more first mechanical securing components.

2. The electronic flight preparation system according to claim 1, in which the connection support comprises the storage memory connected to the first computer connector and to the second computer connector.

3. The electronic flight preparation system according to claim 1, in which the first translational guiding component and the second translational guiding component constitute a mechanical dovetail system.

\* \* \* \* \*